United States Patent [19]
Miller

[11] Patent Number: 5,671,775
[45] Date of Patent: Sep. 30, 1997

[54] VALVE FLUID PRESSURE LEAKAGE SIGNALING

[75] Inventor: Robert F. Miller, Arcadia, Calif.

[73] Assignee: Vemco Corporation, San Dimas, Calif.

[21] Appl. No.: 639,546

[22] Filed: Apr. 29, 1996

Related U.S. Application Data

[60] Provisional application No. 60/007,378, Nov. 20, 1995.

[63] Continuation-in-part of Ser. No. 583,786, Jan. 11, 1996.

[51] Int. Cl.$^6$ .............................. F16K 1/34; F16K 37/00
[52] U.S. Cl. ..................... 137/557; 137/312; 251/335.2
[58] Field of Search .................... 137/557, 312, 137/556; 251/335.2

[56] References Cited

U.S. PATENT DOCUMENTS

| | | | |
|---|---|---|---|
| Re. 34,923 | 5/1995 | Ruesh | 137/312 |
| 420,155 | 1/1890 | Hageman . | |
| 669,328 | 3/1901 | Staedeli et al. . | |
| 1,349,145 | 8/1920 | Breinl . | |
| 1,525,113 | 4/1925 | Yarnall . | |
| 1,853,156 | 4/1932 | Sobon . | |
| 1,933,085 | 10/1933 | Barchard . | |
| 2,855,940 | 10/1958 | Milleville et al. . | |
| 3,838,707 | 10/1974 | Wachowitz, Jr. . | |
| 4,171,792 | 10/1979 | Bass . | |
| 4,231,549 | 11/1980 | Visalli . | |
| 4,461,316 | 7/1984 | Cove et al. | 137/312 |
| 4,499,846 | 2/1985 | Bergeron et al. . | |
| 4,671,490 | 6/1987 | Kolenc et al. . | |
| 4,687,017 | 8/1987 | Danko et al. . | |
| 4,732,363 | 3/1988 | Kolenc et al. . | |
| 4,760,990 | 8/1988 | Kerger et al. . | |
| 4,840,195 | 6/1989 | Zabrenski . | |
| 4,874,007 | 10/1989 | Taylor . | |
| 4,928,919 | 5/1990 | Daicho et al. . | |
| 5,048,554 | 9/1991 | Kremer . | |
| 5,203,370 | 4/1993 | Block et al. . | |
| 5,261,442 | 11/1993 | Kingsford et al. | 137/312 |

FOREIGN PATENT DOCUMENTS

| | | |
|---|---|---|
| 2127640 | 1/1995 | Canada . |
| 635310 | 6/1994 | European Pat. Off. . |
| 9116216 | 10/1991 | Germany . |
| 86439 | 1/1988 | Luxembourg . |
| 86714 | 7/1988 | Luxembourg . |
| 87601 | 2/1990 | Luxembourg . |
| 2274331 | 7/1994 | United Kingdom . |
| 2127641 | 1/1995 | United Kingdom . |

Primary Examiner—A. Michael Chambers
Attorney, Agent, or Firm—William W. Haefliger

[57] ABSTRACT

In a valve unit to control the flow of high-pressure fluid, the combination comprises a housing having a fluid inlet and a fluid outlet, a flow port in the housing communicating between the inlet and outlet, and a seat associated with the flow port; a stopper to be moved toward and away from the seat; a flow chamber in the housing to which high-pressure fluid flows when the stopper has been moved from the seat, for flow to the outlet, the stopper used to close off the flow when the stopper engages the seat; a cap carried by the housing at the outlet; and first signal means associated with the cap to signal presence or absence of pressurized fluid leakage into the flow chamber before the stopper has been moved from the seat.

16 Claims, 5 Drawing Sheets

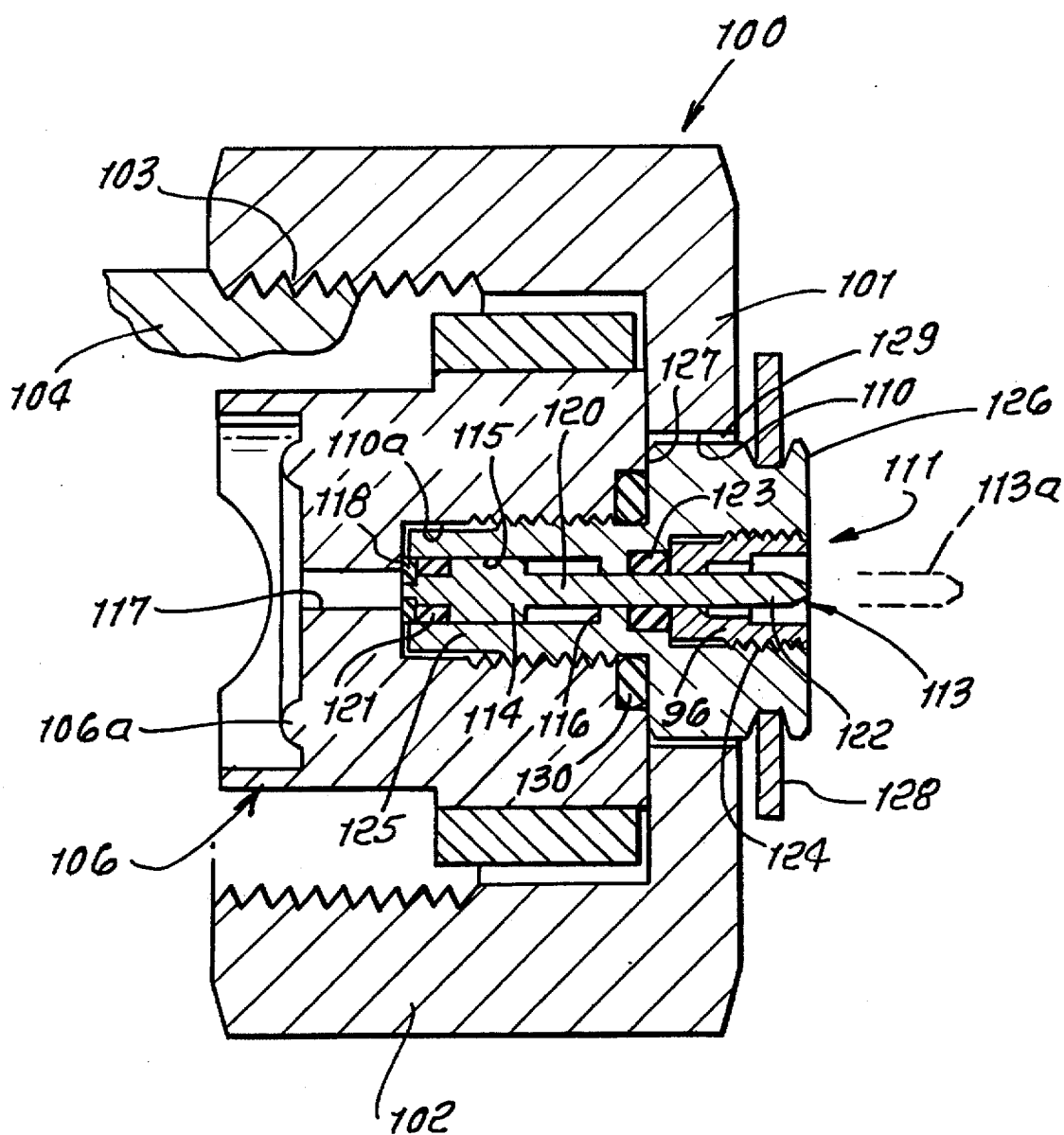

VALVE FLUID PRESSURE LEAKAGE SIGNALING

This application is a continuation-in-part of prior application Ser. No. 08/583,786, filed Jan. 11, 1996, pending, which claims priority from provisional application Ser. No. 60/007,378 filed Nov. 20, 1995.

BACKGROUND OF THE INVENTION

This invention relates generally to signaling of high pressure gas leakage from valves, and also to valves adapted to use on high-pressure cylinders, to control delivery of gas from such cylinders, with improvements in means to signal leakage of high-pressure gas past stoppers and also past diaphragms, used in such valves, in association with movable means to open and close valve stoppers.

There is need for improvements in the construction and operation of leak-signaling means, as used in association with cylinder valves, and which promote safety and reliability of such valves.

SUMMARY OF THE INVENTION

It is a major object of the invention to provide improvements meeting the needs referred to.

It is another object to provide improvements in signaling means, in association with a valve unit comprising:

a) a housing having a fluid inlet and a fluid outlet, b) a flow port in the housing communicating between the inlet and outlet, and a seat associated with said flow port, c) a stopper to be moved toward and away from the seat, d) a flow chamber in the housing to which high-pressure fluid flows when the stopper has been moved from the seat, for flow to the outlet, the stopper closing off such flow when the stopper engages the seat, e) a cap carried by the housing at the outlet, f) and first signal means associated with the cap to signal presence or absence of pressurized fluid leakage into the flow chamber before the stopper has been moved away from the seat.

Another object is the provision of signaling means to include a plunger chamber, and a plunger movable in the plunger chamber from a retracted, non-signaling position to an extended signaling position in response to presence of pressurized fluid leakage to a control chamber in the valve.

A further object includes provision of such first signaling means at an outlet cap on the valve housing.

Yet another object includes provision of:

g) a stem structure in the housing, the stopper carried by the stem structure, to be moved therewith, h) a stack of diaphragms, such as metallic diaphragms, connected to the stem structure and to the housing, to flex and seal off therebetween as the stem structure moves, the flow chamber located in the housing at one side of the diaphragms, and a control chamber in the housing at the opposite side of the diaphragms, i) and second signal means carried by the housing to signal presence or absence of pressurized fluid leakage and to the control chamber, independently of operation of said first signal means.

These and other objects and advantages of the invention, as well as the details of an illustrative embodiment, will be more fully understood from the following specification and drawings, in which:

DRAWING DESCRIPTION

FIG. 5 is an enlarged view of the FIG. 4 signaling means.

DETAILED DESCRIPTION

Figure 1:
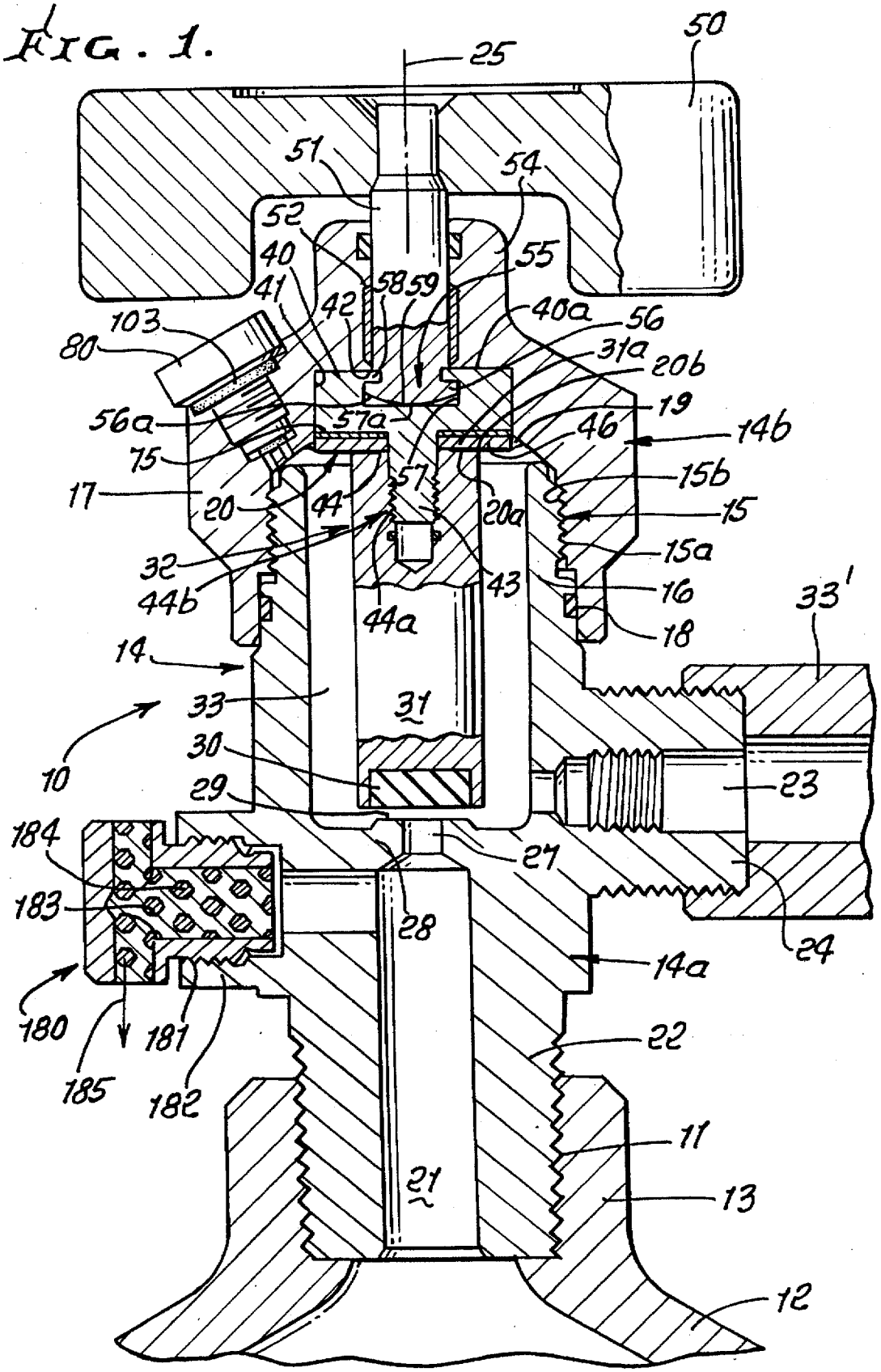
FIG. 1 is a vertical section taken through a valve.

One form of valve unit 10 with or on which the invention is usable is shown in FIG. 1 as connected at 11 to a high-pressure gas (or other fluid) cylinder 12, as at upper neck 13 of the cylinder. That valve unit includes a housing 14, which may for example be metallic, that in turn may typically include a body 14a and a cap 14b connected to the body at 15. The connection 15 may advantageously include external thread 15a on upper tubular extent 16 of the body, and internal thread 15b on the cap skirt 17 telescopically received over the body upper extent 16. An O-ring seal 18 is provided between 17 and 16, below the thread connection 15, to block escape of any pressurized fluid that may leak past the thread, from a chamber 33.

The housing body has a pressurized fluid inlet 21 in body lower tubular extent 22, and a pressurized fluid outlet 23 in a body tubular sideward or transverse tubular extent 24. A body longitudinal axis appears at 25. A flow port is provided in the body, as at 27, through body transverse wall 28, and a valve seat is provided at 29 at the upper transversely flat side of wall 28. A seal or stopper 30, carried by a stem 31, is movable upwardly away from the seat and port 27 to open the valve unit, allowing flow through 21, 23, 27, and 33, to discharge piping 33'; and the seal or stopper is movable downwardly toward the port 27 to close against the seat, blocking fluid flow to 23.

Seal or stopper 30 may consist of non-metallic material, such as an elastomer or plastic substance. Its diameter or width "w" is slightly greater than that of the upwardly protruding seat 29, to ensure tight closure. The stopper and seat may be circular about axis 25, as shown.

Figure 4:
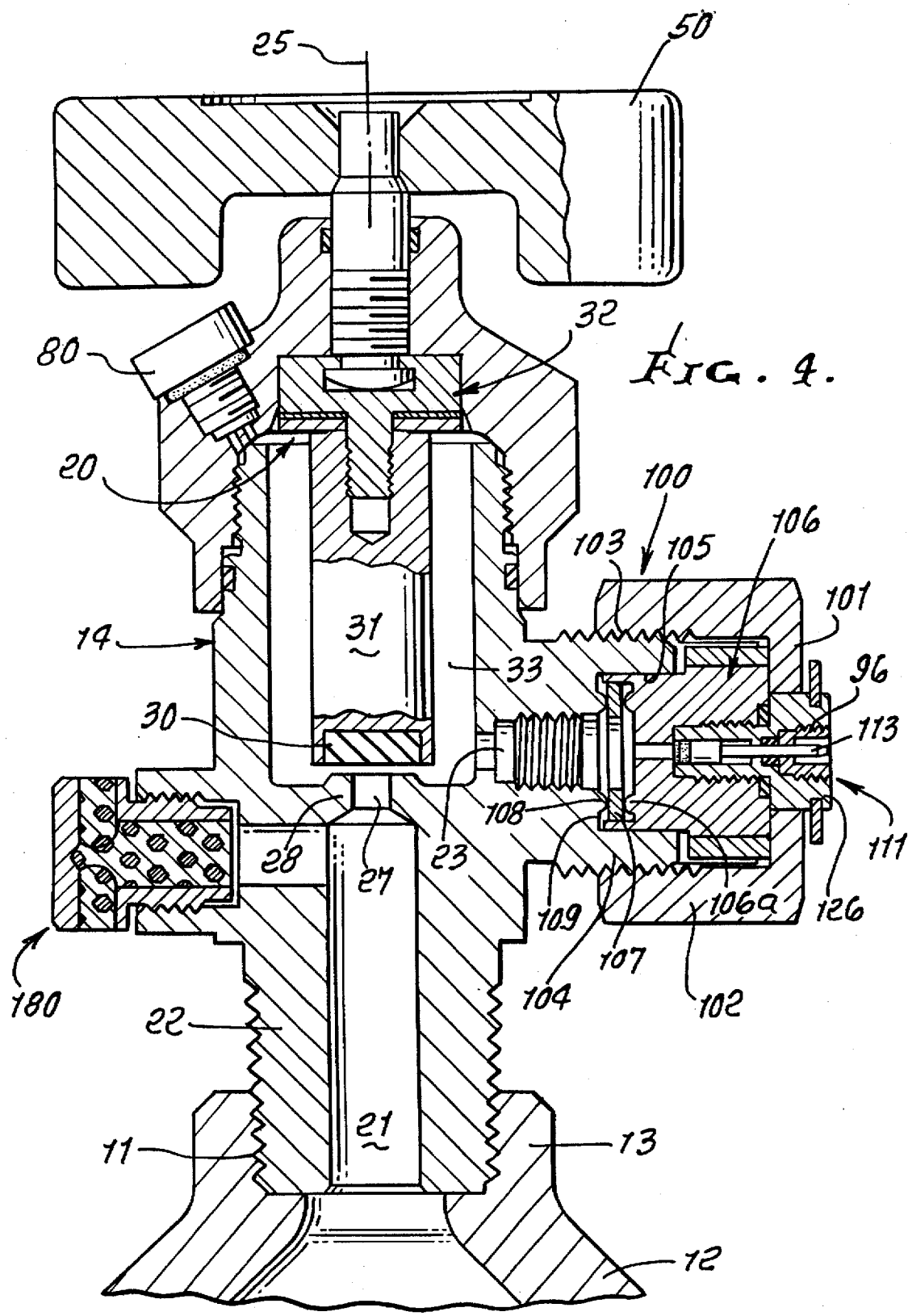
FIG. 4 is a view like FIG. 1 showing signaling means.

Referring to the form of the invention shown in FIGS. 4 and 5, the valve outlet is typically initially capped, prior to use of the valve to dispense cylinder gas. After cap removal, discharge piping 33' is connected to the outlet as in FIG. 1, the stopper being closed during cap removal and piping 33' connection. As shown in FIG. 4, cap 100 has an end wall 101 and a skirt 102 with thread connection at 103 to the valve housing outlet receptacle 104. The latter has a bore 105 into which an annular insert 106 is received. A sealing washer 107 is received between the annular protrusion 106a on the insert, and the annular protrusion 108 on the internal wall 109 of the receptacle. Cap end wall 101 clamps the insert 106 toward the washer, held in clamped and sealing position, between 108 and 106a.

A first signal means 111 is carried by the insert 106. See bores 110 and 110a in 101 and 106, respectively. The signal means includes a plunger carrier 125, in bore 110a, and a plunger 113 movable endwise from a retracted, non-signaling position (see full lines in FIGS. 4 and 5) to external signaling position (see broken lines 113a in FIG. 5) in response to pressurized fluid leakage past the port 27 and closed stopper 30, into the flow chamber 33.

The plunger includes a portion 114 slidable in bore 115 in carrier 125 to engage shoulder 116, in signaling position.

Leakage pressure is transmitted via port 117 to elastomeric sealing pad 118 in bore 115, and transmitting force to the plunger stem 120. Note elastomeric O-ring 121 about that stem and sealing against the bore 115. The plunger outer stem 122 projects through and O-ring 123 retained by a sleeve 96 through which outer stem 122 projects, axially. Sleeve 96 has thread connected reception at 124 in the carrier 125. Carrier 125 head flange 126 engages end shoulder 127 on the insert 106 against which the cap wall 101 is engaged, and flange 126 pressurizes a large elastomeric O-ring 130 to seal off between 126 and 106. An annular ring 128 is carried by the flange 126 to protectively cover the clearance 129 between 101 and 126.

Referring to FIGS. 1 and 4, stem structure 32 includes and supports stem 31 to extend axially within flow chamber 33 at the lower side of the diaphragm structure 20, and above wall 28, whereby fluid pressure is exerted upwardly on the diaphragm structure when flow port 27 is open, i.e., seal or stopper 30 is elevated, as shown in FIG. 1.

As shown in FIG. 1, the radially inner extent 20a of the diaphragm structure is confined against the upper end 31a of metallic stem 31. A weld may be provided at that location to prevent leakage. The stem structure 32 includes a guide 40 slidable axially in cap bore 41, and having an uppermost position, as shown, in which the upper surface 40a of the guide engages the inner surface 42 of the cap to limit upward travel of the stem structure and the seal or stopper 30, upon opening of the valve.

A central stem or diaphragm screw 43, integral with the guide 40, projects downwardly through a central opening 44 through the diaphragm structure, and into a threaded bore 44a in the stem 31. Adjustable threaded connection at 44b permits adjustable compression of an annular diaphragm cushion 46 located between a thin metallic washer 75 at the lower surface 40b of the guide, and the upper annular surface extent 20b of the diaphragm structure 20. The latter is defined by a stack of thin metallic diaphragms, which are transversely co-extensive, as shown. Such diaphragms 20c are illustrated, as in FIG. 3.

A control handle 50, located above the cap, is rotatable about axis 25 to move the axial and stem centering guide 40 axially up and down, to open and close the valve. For this purpose, the handle is integral with an upper stem 51, thread connected at 52 to a bore in upper extent 54 of the cap 14b. The lowermost extent of the threaded stem 51 has universal joint connection at 55 to the guide 40, to prevent binding of axial movement of the guide 40, as referred to above. As shown, the connection 55 includes a flange 56 integral with lowermost extent of stem 51, received in an internal groove 57 formed in the guide 40. An annular inner lip 58 on 40 extends over the flange, to captivate it in groove 57; and the convex lower surface 56a of the flange has centralized bearing surface engagement at 59 with the bottom transverse surface 57a of the groove 57. As a result, relatively rotatable, non-binding, thrust-bearing surfaces are provided. Groove 57 and lip 58 have radial extensions to make assembly possible. In lieu of the thread connected stem, another embodiment would include a cylinder, capable of being pressurized, that would in turn cause a piston to travel forward and move the axial and stem centering guide 40 axially up and down.

Figure 2:
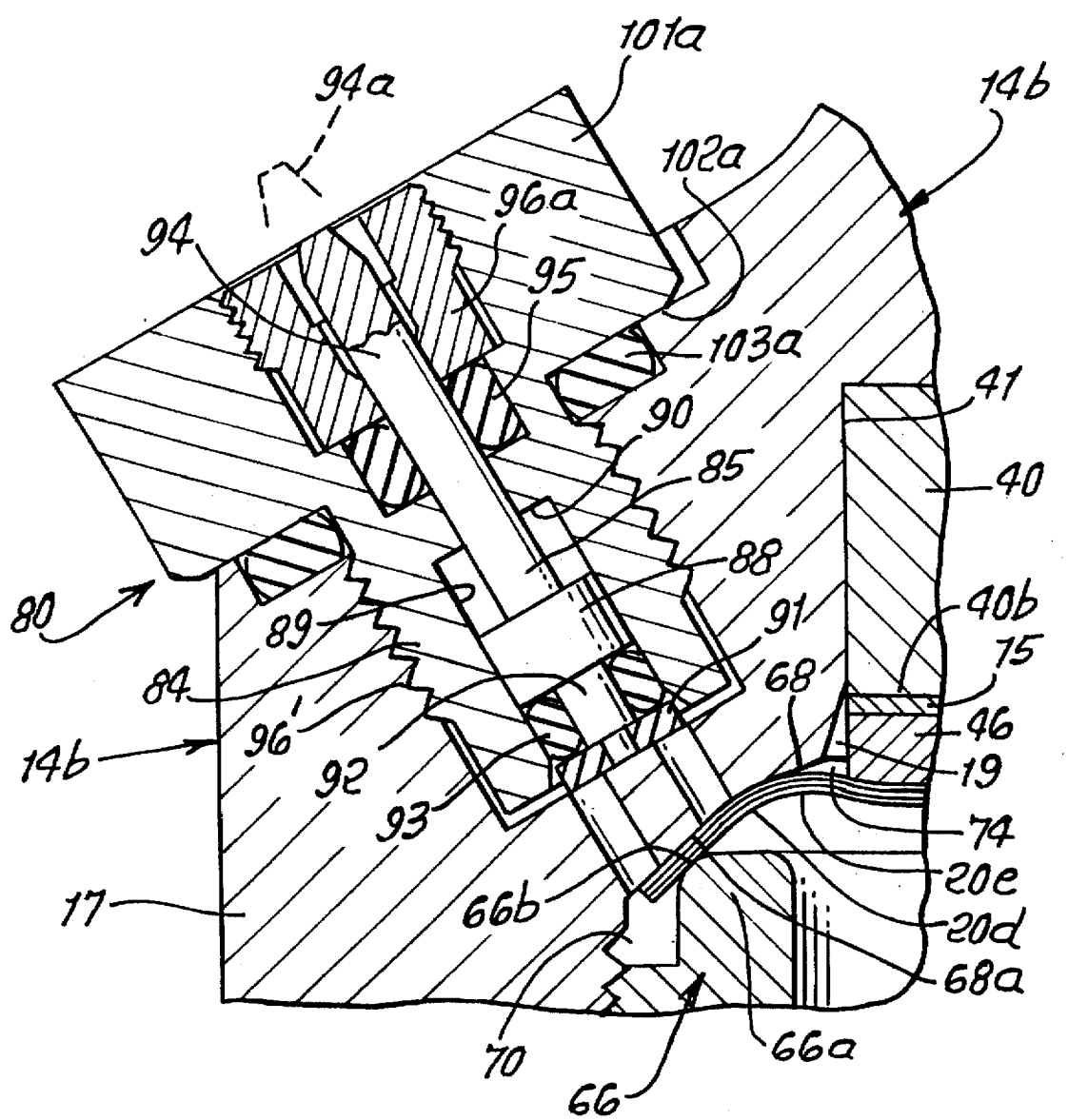
FIG. 2 is an enlarged, fragmentary, vertical section taken through a portion of FIG. 1 showing leak detector details.
Figure 3:
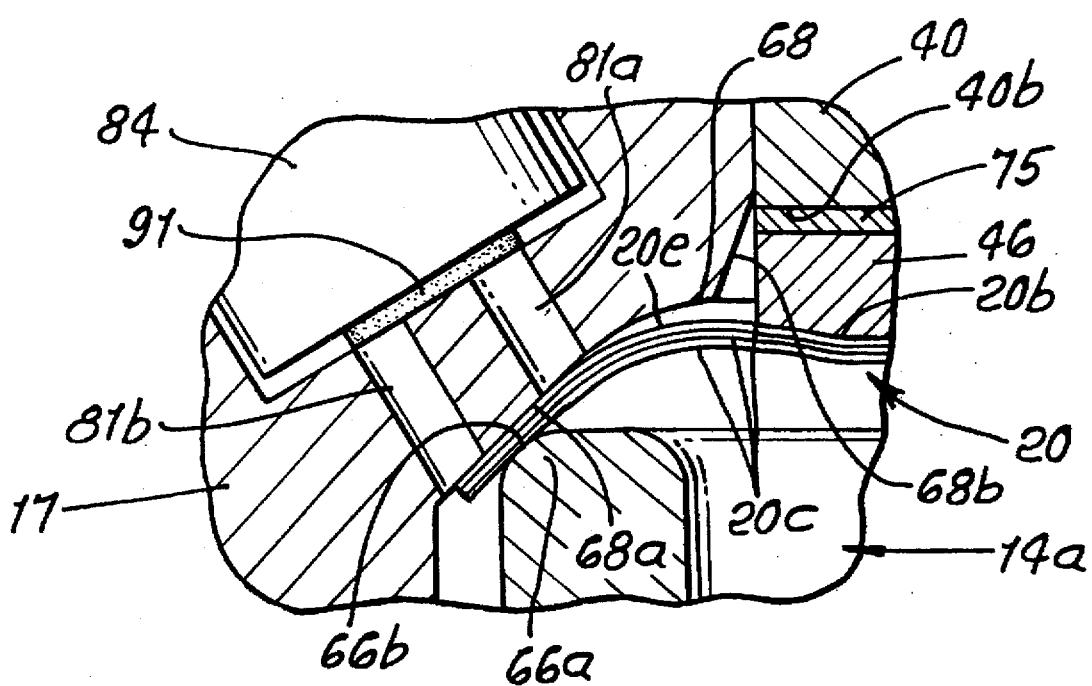
FIG. 3 is a further enlarged fragmentary vertical section taken through a portion of FIG. 2 showing diaphragm details.

Referring to FIGS. 2 and 3, the diaphragm stack 20 has an outer portion 20d that projects annularly outwardly beyond outermost extent of the cushion structure 46. In this regard, body 14a has a tubular, upper terminal portion 66 defining a projecting end 66a that has a convex or domed annular sealing shoulder 66b clamping the diaphragm stack outer portion toward the cap surface 68a. The cap in turn has a complementary annular concave shoulder 68 against which the diaphragm stack outer portion 20d is conformingly engageable as the diaphragm structure in region 20e flexes in a direction away from the flow port. The cap shoulder 68 projects annularly outwardly away from or beyond outermost extent of the cushion structure, and from a shoulder circular outer terminus 68b adjacent the cushion structure that remains adjacent that terminus as the diaphragm flexes and the cushion moves axially. Maximum support for the diaphragm is thereby achieved. A gap 74 is defined in the control chamber between 20e, 68 and 46.

The cushion may advantageously consist of Neoprene, of hardness between 65 and 75 shore A. The pressurized metal-to-metal seal at clamping zone or shoulder 66b blocks leakage of high-pressure fluid past the diaphragm. In the unlikely event of such leakage at zone 66b, it will be detected, in the manner to be referred to. Leakage might occur via the control chamber 19, because a rupture or other defect in the diaphragm structure 20 permits gas to leak from chamber 33 into the control chamber 19 and to access passage 81a, or it might occur from the flow chamber 33, and across domed shoulder 66b at the underside of the diaphragm stack, to zone 70 and thence to the passage 81b. Leakage to 70 will be contained by the O-ring seal 18 referred to above. Passages or ports 81a and 81b are in the cap and communicate with signaling means, referred to below.

Referring now to FIG. 2, means on the cap 14b is provided to signal the presence of pressurized fluid leaking past the diaphragm structure 20 as referred to.

That second signal means 80 includes a plunger chamber 84 and a plunger 85 movable in the plunger chamber from a retracted, non-signaling position 94 (see full lines in FIG. 2) to extended signaling position 94a (see broken lines in FIG. 2) in response to presence of pressurized fluid leakage past the diaphragm stack.

The plunger includes a piston 88 slidable in bore 89 in the chamber 84 to engage shoulder 90 in signaling position. Leakage pressure is transmitted via either or both ports 81a and 81b to elastomer annular sensing pad 91 in bore 89, and to the plunger stem 92. Note annular elastomer O-ring 93 about that stem and sealing against the bore 89. The plunger outer stem 94 projects through an O-ring 95 retained by sleeve 96a, through which stem 94 projects, as shown. Chamber 84 has thread-connected reception at 96' in the cap 14. Chamber head flange 101a rests at shoulder 102a on the cap, and pressurizes a large elastomer O-ring 103a to seal off between 84 and the cap 14b.

Leakage of pressure fluid via the upper or lower sides of the clamped diaphragm stack is thereby signaled.

The following are important features:

▲ Upwardly Convex Radius

The diaphragms have been formed with a radius to allow for the axial movement they must undergo during normal operation of the valve. To insure that the diaphragms remain under a tensile load, which is highly desirable, the diaphragms are formed with upwardly convex meridians from the high-pressure cavity or flow chamber.

From the point at which the diaphragm structure is sealed between the cap and the body inwardly for some distance, the diaphragm is fully supported by the cap. When the valve is fully open, the diaphragm inwardly of such support by the cap is fully supported by the diaphragm cushion. Thus, in the open position, substantially the entire diaphragm is fully supported by a combination of the cap and the diaphragm cushion.

▲ Inner Transition Radius

To help spread the load of the diaphragms evenly and over as large a surface extent as possible, the upwardly convex diaphragm meridian has a small transition radius to which the diaphragm cushion closely conforms. The diaphragm cushion completely supports the piston area. The inner transition radius is upwardly concave and is therefore potentially weak. However, this region is fully supported by the diaphragm cushion.

▲ Diaphragm Cushion 46

To enable the load on the diaphragms to be constantly and consistently supported during the entire axial movement, the resilient diaphragm cushion 46 and a cushion washer 75 are sandwiched between the diaphragms and the guide 40. They are held in place by tightening the diaphragm screw 43 to a level that puts a compressive pre-load on the resilient diaphragm cushion. See FIG. 3. As the diaphragms flex up and down, the diaphragm cushion is deformed to closely back up the shape of the diaphragms. When the load and the need for distort increases, the diaphragm cushion will distort more and flow out into any diaphragm areas that have no support, such as diaphragm area adjacent to 19. When the load and the need for support decreases, the "memory" of the resilient elastomer cushion helps draw it back into its original shape, allowing it to retain the ability to store energy for the next time the load, and the need for support increases.

▲ Cushion Washer 75

The cushion washer is located between the stem or screw 51 and the diaphragm cushion. The cushion washer allows the diaphragm screw to be tightened into the seal holder without putting any radial shear on the diaphragm cushion. This greatly enhances the cushion's ability to support a load and return to its original shape when the load is removed.

▲ Diaphragm Screw 43 The diaphragm screw transmits the axial load from the adjusting screw 52 to the seal holder 31 and diaphragms 20d. The cap bore 41 closely receives the guide 40 integral with the diaphragm screw. The opening of this bore has a conical shape to allow for distortion of the diaphragm cushion, and to prevent shearing it. The depth of this bore is such that, when the valve is fully open, all axial load is removed from the adjusting screw. The guide 40 will then make contact with the bottom 42 of this bore and fully support the load placed on the diaphragms and stem 31. This will prolong the useful life of the adjusting screw, as it will spend the majority of its operating life with no axial load exerted on the threads at 52. The aforementioned bottoming aspect of the diaphragm screw also acts as a finite limit on how far the valve can be opened by hand. This will prevent the diaphragm from being overflexed upwardly, upon opening of the valve, and cause the amount of annular gap between the seat and seal to be closely controlled, thereby guaranteeing consistency of flow performance from unit to unit.

Also illustrated is a means to provide outgassing from port 21 to the interior in case of excess temperature rise. Note plug 180 threaded at 181 into body side fitting 182. The plug stem contains passages 183, which intercommunicate. Metal in such passages melts at high temperatures, and drains outwardly (see arrow 185), thereby to provide an outgassing passage or passages.

Typically, a diaphragm that is used as a boundary between areas of high and low pressure has several mechanisms of failure. High pressure gas can leak around the clamp area on the periphery, leak through the welded area near the centerline, or leak through the diaphragm, as would be the case if it were to rupture. In the type of cylinder valve disclosed, a failure of the diaphragm presents the problem that any leak would remain undetected for a long time, due to the back-up O-rings that are installed. The function of these back-up O-rings is to protect against leakage from the valve unit in the event of a diaphragm leak.

The apparatus alerts an attendant to a leaking diaphragm, without allowing any of the gas to escape to the surrounding environment, and is positioned in such a way that one device will detect a leak from any of the three above-mentioned modes or places.

As referred to, the cap of the diaphragm valve is drilled and threaded to receive a threaded body. This body houses a pin that is fitted with two O-rings that serve as a pressure boundary. On the end of this pin is affixed a sensing pad. This sensing pad exerts an upward force, when exposed to any increase in gas pressure, causing the end of the pin to protrude from the threaded body in a manner that is immediately noticeable to an experienced attendant. The bottom of the drilled and threaded hole is made flat, and two holes of smaller diameter machined through to intersect the internal abutment shoulder that is on the inside of the cap. The holes intersect the abutment shoulder in such a way so as to be able to communicate leaks from the center of the diaphragm outward to the sensing pad, and the outer edge of the diaphragm inwards to the sensing pad. Leakage from any conceivable failure mode of the diaphragm or its seal can thereby be detected and registered by a single device.

I claim:

1. In a valve unit to control the flow of high-pressure fluid, the combination comprising
   a) a housing having a fluid inlet and a fluid outlet,
   b) a flow port in the housing communicating between the inlet and outlet, and a seat about said flow port,
   c) stem structure in the housing and a stopper carried by the stem structure to be moved longitudinally axially toward and away from said seat,
   d) a flow chamber in the housing to which high-pressure fluid flows when the stopper has been moved from the seat, for flow to the outlet, the stopper closing off said flow when the stopper engages the seat,
   e) a cap carried by the housing at said outlet,
   f) and first signal means associated with said outlet to signal presence or absence of pressurized fluid leakage into the flow chamber before the stopper has been moved from the seat,
   g) a stack of metallic diaphragms connected to the stem structure and clamped to the housing, to flex and seal off therebetween as the stem structure moves, said flow chamber located in the housing at one said of the diaphragms, and a control chamber in the housing at the opposite side of the diaphragms,
   h) deformable cushion structure in said control chamber to cushion movement of the diaphragms in one direction, and to conform to diaphragm flexing,
   i) said diaphragms having outer portions thereof concave toward one of said chambers, said concave outer portions projecting generally radially outwardly of said cushion structure and also longitudinally,
   said diaphragms having annular inner portions thereof retained between portions of said cushion structure and said stem structure.

2. The combination of claim 1 including a flow nipple at the outlet and associated with the cap, the signal means carried by both the cap and flow nipple, whereby the signal means is removable with the cap, from the housing.

3. The combination of claim 1 wherein said signal means includes a plunger chamber, and a plunger movable in the plunger chamber from a retracted, non-signaling position to an extended signaling position in response to presence of pressurized fluid leakage into the control chamber.

4. The combination of claim 3 wherein said plunger has a piston slidable within a bore defined by the plunger chamber, and a stem projecting toward the housing, there being porting at the outlet extending toward said plunger chamber, and a sensing pad in the plunger chamber between said porting and said piston.

5. The combination of claim 4 including a stop shoulder in the plunger chamber to limit movement of the piston as the plunger moves toward said extended signaling position.

6. The combination of claim 4 including an elastomeric O-ring extending about the stem to seal off between the stem and said bore as the plunger moves between retracted and extended positions.

7. The combination of claim 1 including
second signal means carried by the housing to signal presence or absence of pressurized fluid leakage from the flow chamber and to the control chamber, independently of operation of said first signal means.

8. The combination of claim 7 wherein said second signal means communicates with a zone that is in a direction of fluid leakage past clamped extent of the stack of diaphragms.

9. The combination of claim 7 wherein there is a gap between said stem structure and said housing, and bridged by the stack of metallic diaphragms.

10. The combination of claim 9 wherein said stem structure defines a longitudinal axis of movement, said diaphragms extend laterally to bridge said gap, and there being porting to conduct leaking fluid from said control chamber to said second signal means.

11. The combination of claim 10 wherein said housing includes a body and a closure cap connected to said body, the diaphragm stack having an outer portion looping about said axis and retained between shoulders defined by said body and closure cap, said porting extending toward said outer portion.

12. The combination of claim 11 including
i) movable control means extending through an opening defined by the closure cap, said control means including a control handle outside the housing and connected with said stem structure, and ii) including a pressurized fluid-containing cylinder supporting the valve unit, the valve unit inlet having communication with fluid in said cylinder, said signal means located between the handle and said cylinder.

13. The combination of claim 7 wherein the diaphragms are clamped at a clamp zone, including passage means in the housing and communicating with a first portion of said clamp zone relatively closer to the flow chamber, and also communicating with a second portion of the clamp zone relatively closer to the control chamber.

14. The combination of claim 13 wherein said passage means including a first duct communicating with said first portion of the clamp zone, and a second duct communication with said second portion of the clamp zone.

15. The combination of claim 14 wherein said second signal means includes a signal plunger and a pressure pad proximate one end of said plunger, both of said ducts communicating with said pressure pad.

16. In a valve, the combination comprising
a) a valve housing having an inlet and outlet,
b) a control means to control fluid flow through the valve between said inlet and outlet, said control means movable axially longitudinally,
c) there being a flow chamber and a control chamber in the housing, the flow chamber passing said flow,
d) a first signal means associated with said outlet to signal fluid pressure leakage into the control chamber when the valve is closed, and
e) a second signal means associated with said control means to signal fluid pressure leakage from said flow chamber to said control chamber,
f) a stack of diaphragms in the housing and having outer portions thereof projecting generally radially outwardly proximate said second signal means and also longitudinally,
g) said control means including stem structure, and said diaphragms having inner portions thereof retained at said stem structure to be movable longitudinally therewith, said stem structure projecting through the diaphragms.

* * * * *